(12) United States Patent
Bannae et al.

(10) Patent No.: US 12,549,733 B2
(45) Date of Patent: Feb. 10, 2026

(54) MEDICAL DATA PROCESSING APPARATUS FOR DETERMINING A COMPRESSION RATIO FOR A REGION OF INTEREST IN A MEDICAL IMAGE

(71) Applicant: Canon Medical Systems Corporation, Otawara (JP)

(72) Inventors: Shuhei Bannae, Utsunomiya (JP); Hikaru Futami, Nasushiobara (JP); Hisaaki Oosako, Utsunomiya (JP); Takahiko Nishioka, Otawara (JP)

(73) Assignee: Canon Medical Systems Corporation, Otawara (JP)

( * ) Notice: Subject to any disclaimer, the term of this patent is extended or adjusted under 35 U.S.C. 154(b) by 457 days.

(21) Appl. No.: 18/153,382

(22) Filed: Jan. 12, 2023

(65) Prior Publication Data
US 2023/0224471 A1     Jul. 13, 2023

(30) Foreign Application Priority Data
Jan. 13, 2022   (JP) ................................ 2022-003884

(51) Int. Cl.
*H04N 19/103*   (2014.01)
*G06T 7/00*     (2017.01)
*H04N 19/115*   (2014.01)
*H04N 19/136*   (2014.01)

(52) U.S. Cl.
CPC ......... *H04N 19/136* (2014.11); *G06T 7/0012* (2013.01); *H04N 19/103* (2014.11); *G06T 2207/20081* (2013.01); *G06T 2207/30004* (2013.01)

(58) Field of Classification Search
CPC .. H04N 19/136; H04N 19/103; H04N 19/115; H04N 19/167; H04N 19/17; G06T 7/0012; G06T 2207/20081; G06T 2207/30004
See application file for complete search history.

(56) References Cited

U.S. PATENT DOCUMENTS

| 5,724,582 A | * | 3/1998 | Pelanek ............... G11B 27/026 |
| 2003/0184273 A1 | | 10/2003 | Nakajima |
| 2004/0057108 A1 | | 3/2004 | Namii |

(Continued)

FOREIGN PATENT DOCUMENTS

| JP | 4-369191 A | 12/1992 |
| JP | 2003-283279 A | 10/2003 |

(Continued)

OTHER PUBLICATIONS

Office Action issued Nov. 4, 2025, in corresponding Japanese Patent Application No. 2022-003884, citing documents 1-4 therein, 5 pages.

*Primary Examiner* — Siamak Harandi
(74) *Attorney, Agent, or Firm* — Oblon, McClelland, Maier & Neustadt, L.L.P.

(57) ABSTRACT

According to one embodiment, a medical data processing apparatus includes processing circuitry. The processing circuitry determines at least one region of interest for performing processing on a medical image and a degree of importance of the region of interest. The processing circuitry calculates a compression ratio for each of the regions of interest according to the degree of importance.

10 Claims, 3 Drawing Sheets

(56) References Cited

U.S. PATENT DOCUMENTS

2012/0189179 A1* 7/2012 Gering ................ H04N 19/162
                                                        382/128
2021/0003651 A1* 1/2021 Kamiguchi ............ G06N 3/045
2021/0383262 A1* 12/2021 Elen .................... G06F 18/2163

FOREIGN PATENT DOCUMENTS

| JP | 2004-109840 A | 4/2004 |
| JP | 2005-287927 A | 10/2005 |
| JP | 2010-281637 A | 12/2010 |
| JP | 2022-502741 A | 1/2022 |
| WO | WO 2020/243556 A1 | 12/2020 |

* cited by examiner

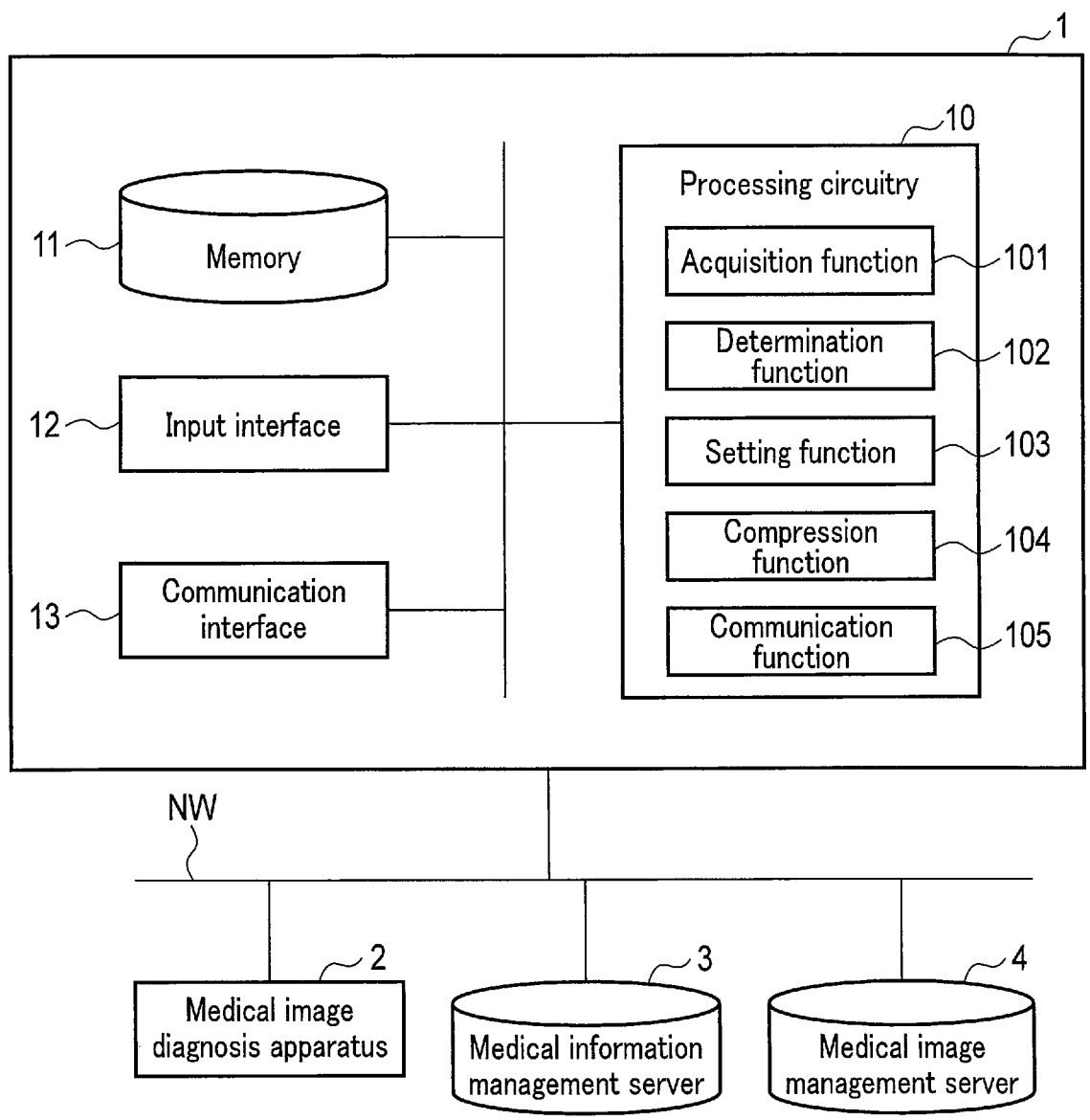
F I G. 1

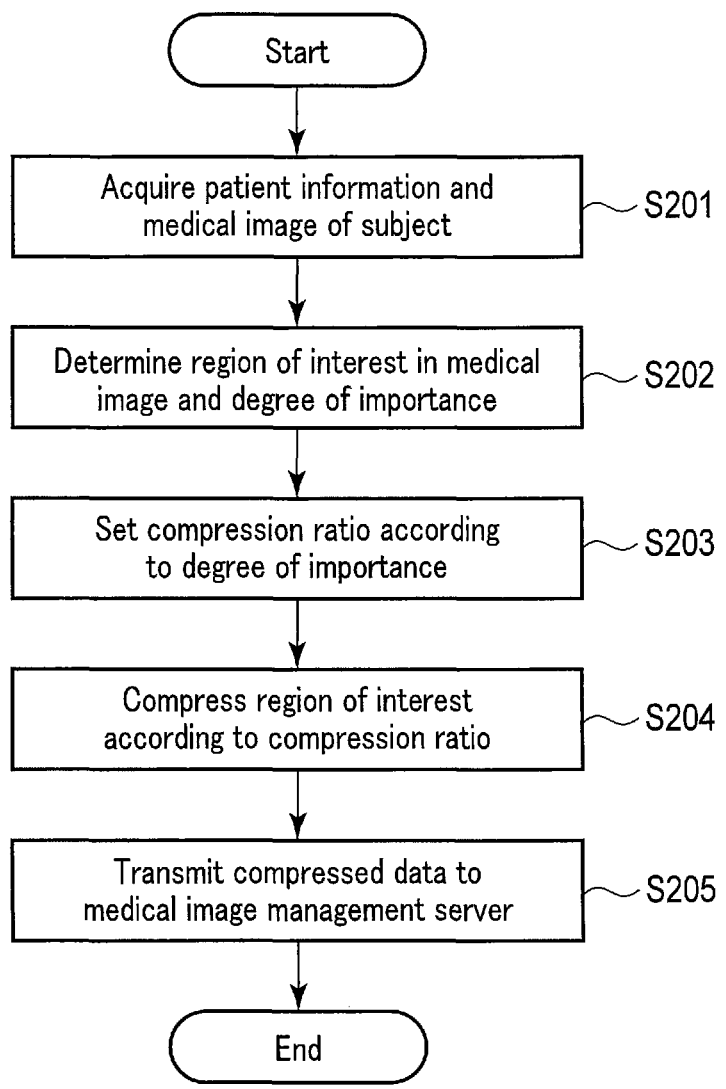
F I G. 2

MEDICAL DATA PROCESSING APPARATUS FOR DETERMINING A COMPRESSION RATIO FOR A REGION OF INTEREST IN A MEDICAL IMAGE

CROSS-REFERENCE TO RELATED APPLICATION

This application is based upon and claims the benefit of priority from Japanese Patent Application No. 2022-003884, filed Jan. 13, 2022, the entire contents of which are incorporated herein by reference.

FIELD

Embodiments described herein relate generally to a medical data processing apparatus, a medical data processing method, and a medical data processing program.

BACKGROUND

Along with enhancement of the image quality of medical images captured by a medical image diagnosis apparatus, digitization of pathological images, and the like, the data size of DICOM (digital imaging and communications in medicine) images handled by an image management server such as a PACS (picture archiving and communication system) server has increased. This not only compresses the storage capacity of the image management server but also requires time in transferring a file and overloads the communication network.

To address the above problem, there is also a method in which, among medical images stored in an image management server, images other than key images are subjected to lossy compression or medical images are subjected to lossy compression after the elapse of a certain period of time. However, even an image that a user such as a medical staff member cannot judge to be diagnostically important by sight sometimes includes important information for an image analysis application; thus, subjecting all images other than key images to lossy compression entails a risk.

Also, a medical image captured by an X-ray computed tomography (CT) apparatus, a magnetic resonance imaging (MRI) apparatus, or the like may be stored for a long period of time for follow-up purposes. Therefore, subjecting a medical image to lossy compression uniformly causes the part necessary for follow-up diagnosis to be also compressed, which is undesirable.

BRIEF DESCRIPTION OF THE DRAWINGS

FIG. 1 is a block diagram showing a medical data processing system including a medical data processing apparatus according to an embodiment.

FIG. 2 is a flowchart showing an example of an operation of the medical data processing apparatus according to the embodiment.

DETAILED DESCRIPTION

Figure 3:
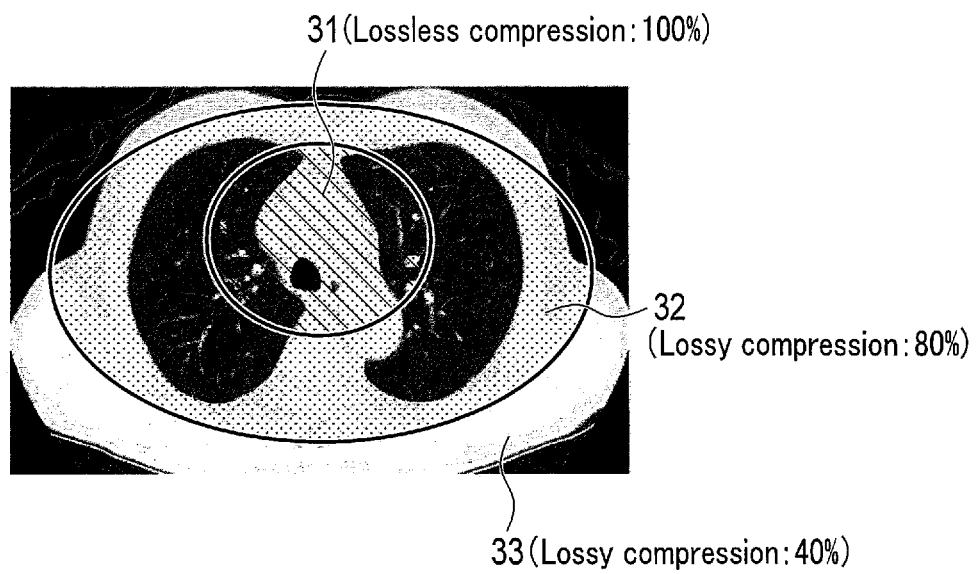
FIG. 3 is a diagram showing a specific example of setting a compression ratio of a region of interest.

In general, according to one embodiment, a medical data processing apparatus includes processing circuitry. The processing circuitry determines at least one region of interest for performing processing on a medical image and a degree of importance of the region of interest. The processing circuitry calculates a compression ratio for each of the regions of interest according to the degree of importance.

Hereinafter, the medical data processing apparatus, medical data processing method, and medical data processing program according to the embodiment will be described with reference to the drawings. In the embodiment described below, elements assigned the same reference numeral perform the same operation, and repeat descriptions will be omitted as appropriate.

The medical data processing system according to the embodiment will be described with reference to FIG. 1.

The medical data processing system according to the embodiment includes a medical data processing apparatus 1, a medical image diagnosis apparatus 2, a medical information management server 3, and a medical image management server 4, which are connected to one another via a network NW so as to be able to communicate with one another. The medical data processing apparatus 1 according to the embodiment may be a separate entity as shown in FIG. 1, or may be included in any one of the medical image diagnosis apparatus 2, the medical information management server 3, or the medical image management server 4.

The medical data processing apparatus 1 includes processing circuitry 10, a memory 11, an input interface 12, and a communication interface 13. The processing circuitry 10, the memory 11, the input interface 12, and the communication interface 13 are connected to one another via, for example, a bus so as to be able to communicate with one another.

The processing circuitry 10 is a processor that functions as the center of the medical data processing apparatus 1. The processing circuitry 10 is, for example, a processor such as a central processing unit (CPU), a graphics processing unit (GPU), etc. The processing circuitry 10 includes an acquisition function 101, a determination function 102, a setting function 103, a compression function 104, and a communication function 105.

The acquisition function 101 acquires, from the medical image diagnosis apparatus 2, a medical image generated by imaging a subject.

The determination function 102 determines at least one region of interest for performing processing on a medical image and a degree of importance for each of the regions of interest. The degree of importance is a degree indicating how important the region of interest is in the processing performed on a medical image. The "processing" as referred to herein includes analytical processing of a medical image using analytical software such as an analytical application, and diagnostic processing performed based on a medical image by medical staff such as a doctor.

The setting function 103 calculates a compression ratio for each of the regions of interest according to the degree of importance.

The compression function 104 generates compressed data of a medical image by compressing at least one region of interest according to its corresponding compression ratio.

The communication function 105 transmits the compressed data to, for example, the medical image management server 4.

The processing circuitry 10 may not include the compression function 104. If the processing circuitry 10 does not include the compression function 104, a medical image and information regarding the compression ratio of each region of interest of the medical image may be transmitted to the medical image management server 4. The medical image management server 4 may receive, from the medical data processing apparatus 1, the medical image and the information regarding the compression ratio of each region of interest of the medical image, compress the image according to the compression ratio corresponding to each region of interest to generate compressed data, and store the compressed data.

The memory 11 is a storage device, such as a read-only memory (ROM), a random-access memory (RAM), a hard disk drive (HDD), a solid-state drive (SSD), or an integrated circuit storage device, which stores various pieces of information. The memory 11 may be, for example, a CD-ROM drive, a DVD/Blu-ray (registered trademark) drive, or a drive which reads and writes various pieces of information from and to a portable storage medium such as a flash memory. The memory 11 need not necessarily be realized by a single storage device. For example, the memory 11 may be realized by multiple storage devices.

Also, the memory 11 may be located inside a different computer connected to the medical data processing apparatus 1 via a network. The memory 11 stores a medical image, a trained model, etc.

The input interface 12 receives various kinds of input operations from a user, converts the received input operations into an electric signal, and outputs the electric signal to the processing circuitry 10. The input interface 12 according to the embodiment is connected to one or more input devices such as a mouse, a keyboard, a trackball, a switch, a button, a joystick, a touchpad, and a touchpanel which allows input of instructions through touch on its operation screen. The input device connected to the input interface 12 may be an input device provided in another computer connected via a network or the like. The input interface 12 also includes the case where it indicates the above-described input device such as a mouse.

The communication interface 13 performs data communication with the medical image diagnosis apparatus 2, the medical information management server 3, and the medical image management server 4, as well as a hospital information system, a radiology department information system (not shown), etc. The communication interface 13 performs data communication in compliance with the known standards set in advance. For example, communication compliant with health level 7 (HL7) is performed between the medical data processing apparatus 1 and each of the hospital information system and the radiology department information system. Also, communication compliant with digital imaging and communications in medicine (DICOM), for example, is performed between the medical data processing apparatus 1 and each of the medical information management server 3 and the medical image management server 4.

The medical image diagnosis apparatus 2 is, for example, an apparatus such as a magnetic resonance imaging (MRI) apparatus, an X-ray computed tomography (CT) apparatus, a positron emission tomography (PET) apparatus, a single photon emission computed tomography (SPECT) apparatus, a PET/CT apparatus, a PET/MRI apparatus, a SPECT/CT apparatus, a PET/MRI apparatus, or an ultrasonic diagnosis apparatus. The medical image diagnosis apparatus 2 generates a medical image by imaging a subject. The medical image diagnosis apparatus 2 may be any medical image diagnosis apparatus, provided that it is capable of imaging a medical image of a subject.

The medical information management server 3 includes, for example, an electronic chart system, and stores and manages patient information. The patient information includes information identifying a patient, such as a patient ID, a patient's name, gender, and age, and information regarding a patient's medical care, such as their past medical history, remark information, information on the name of a disease, a treatment content, and a clinical path.

The medical image management server 4, which is, for example, a picture archiving and communication system (PACS), stores medical image data and manages the stored medical image data. The medical image management server 4 stores and manages medical image data converted in accordance with, for example, the DICOM standard.

The network NW is, for example, an intra-hospital network. The network NW may be either wired or wireless. The connection need not necessarily be made to an intra-hospital network, provided that the security is ensured. For example, the connection may be made to a public communication line such as the Internet via a virtual private network (VPN), etc.

Next, an example of an operation of the medical data processing apparatus 1 according to the embodiment will be described with reference to the flowchart of FIG. 2.

In step S201, a medical image of a patient is acquired from the medical image diagnosis apparatus 2 using the acquisition function 101. Patient information of the patient is also acquired from the medical information management server 3.

In step S202, one or more regions of interest in the medical image and a degree of importance of each of the one or more regions of interest are determined using the determination function 102. A region of interest may be determined based on at least any one of the medical image, the patient information, an analytical application used subsequently, or a trained model, for example.

If the region of interest is to be determined based on a medical image, a predetermined region may be employed as the region of interest. For example, when imaging is performed using the medical image diagnosis apparatus 2, an image is often captured so that an important portion that one desires to observe is located in the center of the image. Therefore, the determination function 102 can determine a region within a range of a predetermined distance from the center of the medical image. The region of interest may also be determined depending on the type of the medical image. For example, in the case of an MR image, a subject is often placed so that a region of interest of a target site is positioned in the center of the magnetic field, or a field of view (FOV) is often set in the center of the magnetic field. Therefore, the determination function 102 may determine the position of the center of the magnetic field on the medical image by referring to, for example, a DICOM tag attached to a DICOM-form medical image and determine a region close to the center of the magnetic field, such as a region within a range of a predetermined distance from the center of the magnetic field, as the region of interest.

If the region of interest is to be determined based on patient information, it may be determined based on a target site corresponding to the past medical history and the purpose of examination. For example, in the case of a patient who underwent surgery for cancer in the right lung in the past, the determination function 102 may determine, as the region of interest, a region on the medical image where the right lung field is located by referring to the past medical history. Also, in the case of a follow-up examination, the determination function 102 may refer to the region of interest set in the past medical image of the patient through the processing performed by the medical data processing apparatus 1 according to the embodiment, and determine the same region of interest as the region of interest of a new medical image.

If the region of interest is to be determined based on an analytical application, a region referred to by the analytical application may be determined as the region of interest. For example, in the case of analyzing a region of the middle cerebral artery (MCA) in the analytical application which analyzes the presence or absence of a brain aneurysm, the determination function 102 may determine the MCA region as the region of interest.

A region on a medical image that is captured by another medical image diagnosis apparatus and makes an abnormal region easy to see, or a region determined as important by another medical image diagnosis apparatus, may be determined as the region of interest. For example, a case is assumed in which the medical image diagnosis apparatus 2 is an X-ray CT apparatus and a CT image is captured in order to diagnose an acute-stage cerebral infarction. Since the acute-stage cerebral infarction is easy to see on an apparent diffusion coefficient (ADC) image captured by an MRI apparatus, a region on a CT image corresponding to a region specified as a cerebral infarction on the ADC image may be determined as the region of interest.

If the region of interest is to be determined based on a trained model, the same type of data as input data used for training may be input to a trained model, so that a region output from the trained model is determined as the region of interest. For example, a medical image and patient information are used as input data and a region of interest and a degree of importance manually selected based on the medical image and the patient information are used as correct data, to train a neural network and generate a trained model. Subsequently, the determination function 102 inputs a target medical image and patient information to the trained model at the time of inference, so that the determination function 102 can obtain a region of interest and a degree of importance of the region of interest.

For a neural network that is used, any network structure used in the field of machine learning, such as a deep neural network (DNN), a convolutional neural network (CNN), a deep convolutional neural network (DCNN), ResNet, DenseNet, U-Net, and BERT, may be adopted.

In a single medical image, multiple regions of interest having the same degree of importance may be determined, or multiple regions of interest having different degrees of importance may be set. This is because not only an analytically and diagnostically important region but also a region supporting the important region contributes to analysis and diagnosis.

Specifically, as an example of setting regions of interest having different degrees of importance, if the purpose of examination is to examine prostate cancer based on patient information, since cancer is likely to metastasize to bones, the determination function 102 may also determine a region where peripheral bones exist as a second region of interest with a second degree of importance having the second highest degree of importance, in addition to determining a region where a prostate is located as a first region of interest with a first degree of importance having the highest degree of importance. As another example, a case is assumed where one wishes to apply an analytical application which extracts a coronary artery to a medical image of an imaged heart. When extracting a coronary artery, not only the information of the region where the coronary artery is located but also information of the position of a sinus of Valsalva, etc., may be used; thus, in addition to determining the region where the coronary artery is located as the first region of interest with the first degree of importance, a region where the sinus of Valsalva is located may be determined as the second region of interest with the second degree of importance.

If patient information is not used when a region of interest and a degree of importance of the region of interest are determined, patient information need not be acquired in step S201.

In step S203, a compression ratio according to the degree of importance is set for each region of interest using the setting function 103. For example, when a case is assumed in which a single region of interest is determined in a medical image, it is assumed that the region of interest has a high degree of importance, and that a region other than the region of interest (referred to as a "region of non-interest") has a low degree of importance. Therefore, the setting function 103 sets a first compression ratio for the region of interest and sets a second compression ratio, which is higher than the first compression ratio, for the region of non-interest. Specifically, the region of interest may be subjected to lossless compression (a compression ratio of 100%), for example, and the region of non-interest may be subjected to lossy compression and set to a compression ratio of 60%, for example.

The expression "compression ratio of N %" (N being a natural number of 0 to 100) as used herein refers to a reproduction ratio of N % when data after compression is decompressed. For example, a compression ratio of 100% means that an original medical image can be reproduced completely, that is, a compression ratio of 100% is a compression ratio of lossless compression. Also, if a medical image is subjected to a lossy compression with a compression ratio of 60% to generate compressed data and the compressed data is decompressed by performing extension processing, the decompressed image has a reproduction ratio of 60% as compared to the original medical image. That is, a high compression ratio is rephrased as a low reproduction ratio.

If two or more regions of interest having different degrees of importance are to be set in a medical image, the setting function 103 sets a compression ratio according to the degree of importance of each region of interest. For example, the first region of interest having the first degree of importance may be subjected to lossless compression, that is, set to a compression ratio of 100%, the second region of interest having the second degree of importance may be set to a compression ratio of 70%, and the region of non-interest may be set to a compression ratio of 30% higher than a compression ratio of 70%. That is, a compression ratio is set in multiple stages in a single medical image so that a region of interest having a higher degree of importance has a lower compression ratio.

With regard to a relationship between the degree of importance and the compression ratio, a table specifying a correspondence relationship between them may be prepared in advance, as in the first degree of importance corresponding to a compression ratio of 100%, the second degree of importance corresponding to a compression ratio of 70%, and the third degree of importance corresponding to a compression ratio of 50%, for example, so that the setting function 103 may refer to the table and set a compression ratio according to the degree of importance set in the medical image. Alternatively, a table showing a relationship between the degree of importance and the compression ratio may be prepared for each type of analytical application applied to a medical image. This enables setting of a compression ratio suitable for the analytical application.

If the region of interest is to be determined based on a trained model, the setting function 103 may set a compression ratio using a so-called heat map related to feature extraction, which is obtained from a middle layer of the trained model. The heat map is generated from intermediate data that may serve as the grounds of estimating which region (feature site) on a medical image the trained model focuses on to generate output data. Thus, if an output value is equal to or greater than a threshold, for example, the setting function 103 may perform setting processing such as setting lossless compression (a compression ratio of 100%) according to the output value of the heat map.

Also, in regard to a region of interest with a low degree of importance (such as the third degree of importance), the setting function 103 may set a higher compression ratio as the area of the region of interest with a low degree of importance in the medical image becomes larger. Thus, for the region with a low degree of importance, it is possible to further reduce a data amount while keeping a certain amount of image information.

Also, for a region of interest with the highest degree of importance, the setting function 103 may perform non-compression processing.

In step S204, each region of interest is compressed according to the compression ratio using the compression function 104 to generate compressed data. In the case of lossless compression, a compression format such as Lossless, JPEG, JPEG-LS, or PNG may be employed as the compression processing. In the case of lossy compression, a compression format such as JPEG or JPEG2000 may be employed.

As a compression method, for example, the compression function 104 refers to positional information of a region of interest on a medical image and performs image-compression processing using a compression format such as JPEG for executing a set compression ratio on a pixel group included in the region of interest based on the positional information. Compressed data can be generated by performing this processing in each region of interest. In regard to specific compression processing based on JPEG, etc., general compression processing may be applied; thus, a concrete description thereof will be omitted.

In step S205, the compressed data is transmitted to the medical image management server 4 via the communication interface 13 using the communication function 105. Through this process, the operation of the medical data processing apparatus 1 described as an example is completed.

If a trained model is used, not only a region of interest and a degree of importance of the region of interest but also a compression ratio may be output. Namely, by inputting a medical image to a trained model, one or more regions of interest, degrees of importance, and compression ratios for the input medical image are output from the trained model.

A trained model that also outputs a compression ratio is obtained by training a neural network before being trained using a medical image as input data and a region of interest, a degree of importance, and a compression ratio for the medical image as correct data. A trained model capable of outputting a compression ratio is thus generated. With regard to a compression ratio of a region of interest used as correct data, for example, data showing approximately what compression ratio would be analyzable in an analytical application may be collected in advance, so that an analyzable range of compression ratios may be calculated according to the specifications of the analytical application by statistical processing or the like.

Also, if the compression processing is not performed by the medical data processing apparatus 1, that is, if the medical data processing apparatus 1 does not include the compression function 104, the communication function 105 may transmit information regarding a region of interest and a compression ratio to the medical image management server 4 after step S203.

Next, a specific example of setting a compression ratio of a region of interest will be described with reference to FIG. 3.

FIG. 3 shows a compression ratio corresponding to a region of interest set on a medical image.

Herein, the center of the medical image is indicated as a region of interest 31 having the first degree of importance, which is the highest degree of importance, the portion including the peripheral lung field is indicated as a region of interest 32 having the second degree of importance, and the other portion is indicated as a region of non-interest 33.

The region of interest 31 is set to lossless compression with a compression ratio of 100%, the region of interest 32 is set to lossy compression with a compression ratio of 80%, and the region of non-interest is set to lossy compression with a compression ratio of 40%.

Next, an example of a decompressed image obtained by extending compressed data will be described with reference to FIG. 4.

Figure 4:
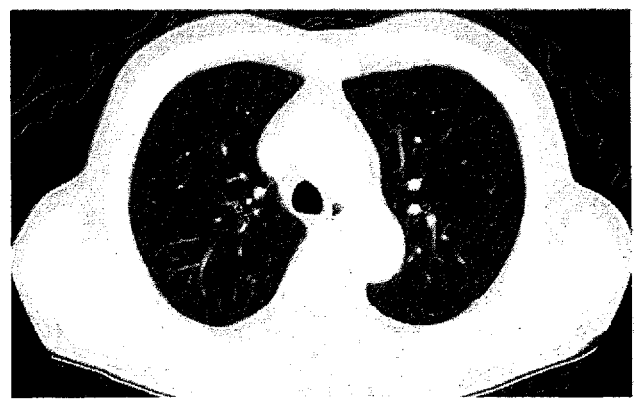
FIG. 4 is a diagram showing an example of a decompressed image obtained by subjecting compressed data to extension processing.
Figure 4:
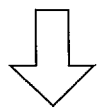
Figure 4:
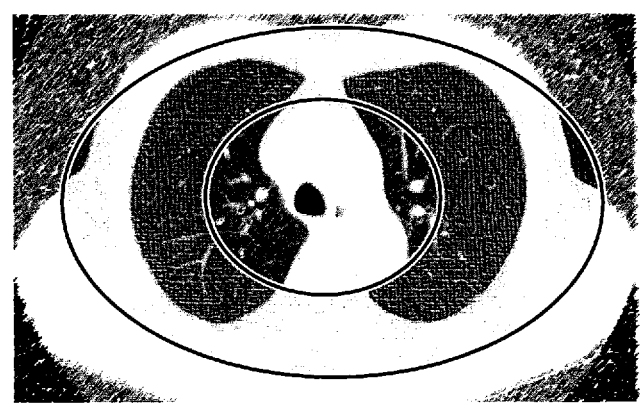

The upper figure in FIG. 4 is an original medical image, and the lower figure in FIG. 4 is a decompressed image obtained by decompressing the compressed data through extension processing. The decompressed image includes three regions of interest compressed at different compression ratios.

As shown in the lower figure in FIG. 4, the decompressed image includes multiple regions having different resolutions in a single medical image. In this instance, since the most important region of interest is subjected to lossless compression, it has the same resolution as that of the original medical image. Thus, an analytical application or a medical staff member can observe or analyze the region of interest in the same manner as in the case of the original medical image. In the example shown in FIG. 4, the contours of each region of interest are displayed in a highlighted manner in the decompressed image for the convenience of explanation; however, the contours of each region of interest need not be displayed.

Also, in the above embodiment, a medical image is taken as an example to describe the embodiment; however, the embodiment can likewise be applied to medical videos such as DICOM-form surgical videos, examination videos, and the like. For example, a region of interest and a region of non-interest are determined for a medical video in the same manner as in the case of a medical image. The region of interest may be set to a compression ratio so as to have a high resolution (a first resolution), and the region of non-interest may be set to a compression ratio so as to have a lower resolution (a second resolution) than the high resolution. Specifically, in the case of a lossy compression format of H.264/SVC, for example, the setting function 103 may encode a medical video so that a region of interest will be a video having a high bit rate and a region of non-interest will be a video having a lower bit rate than the high bit rate, and the medical image management server 4 may receive a stream according to each bit rate of the region of interest and the region of non-interest and store the medical video. Thereby, the region of non-interest can be a low-resolution video while the region of interest is a high-resolution video not causing any problems for an analytical application or diagnosis, and as a result, the data size can be greatly reduced as compared with the original medical video.

According to the embodiment described above, a region of interest and a degree of importance of the region of interest are set in a medical image. Compressed data is generated by setting a compression ratio according to the degree of importance. Also, since the region of interest is an important region for analysis and diagnosis, the compression ratio is set low so as to maintain the resolution, and since the region of non-interest is not considered to be important for analysis and diagnosis, the compression ratio is set high. Thus, it is possible to reduce the data size while maintaining the accuracy of analysis and diagnosis performed on a medical image. Further, if compression processing is performed on a medical image on a medical image data apparatus side, it is possible to transmit and receive data and store it under a lower load and more efficiently than transmitting and receiving a medical image and storing it in a medical image management server as-is.

The term "processor" according to the embodiment means, for example, circuitry such as a central processing unit (CPU), a graphics processing unit (GPU), an application-specific integrated circuit (ASIC), a programmable logic device (e.g., a simple programmable logic device (SPLD), a complex programmable logic device (CPLD), or a field programmable gate array (EPGA)), etc. If the processor is a CPU, for example, the processor realizes its function by reading and executing the program stored in storage circuitry. On the other hand, if the processor is an ASIC, for example, that function is directly incorporated in the circuitry of the processor as a logic circuit, instead of a program being stored in the storage circuitry. The processors described in connection with the above embodiment are not limited to single-circuit processors; a plurality of independent circuits may be integrated into a single processor that implements the functions. In addition, the plurality of components shown in FIG. 1 may be integrated as a single processor to implement the functions thereof.

The functions 101 to 105 according to the foregoing embodiment are not limited to implementations through a single processing circuitry component. Multiple independent processors may be employed together to form the processing circuitry so that the processors run programs to realize the functions 101 to 105. Also, the functions 101 to 105 may each be stored as a program in the memory 11, etc., so that the processing circuitry 10 executes the programs to implement the functions corresponding to the respective programs.

Moreover, the functions according to the embodiment may also be realized by installing programs for executing the processes described in connection with the embodiment in a computer such as a work station, and loading the programs on a space in the memory. Here, the programs for causing the computer to execute the processes may be stored in a storage medium, such as a magnetic disk (a hard disk, etc.), an optical disk (a CD-ROM, a DVD, Blu-ray Disc™), and a semiconductor memory, and distributed.

According to at least one embodiment described above, it is possible to reduce the data size while maintaining the accuracy of analysis and diagnosis performed on a medical image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical data processing apparatus, comprising:
processing circuitry configured to:
determine at least one region of interest for performing processing on a medical image and a corresponding degree of importance of the at least one region of interest; and
determine a compression ratio for each region of interest, of the determined at least one region of interest, according to the degree of importance by referring to a table, for each of applications for analyzing the medical image, indicating a relationship between the compression ratio and the corresponding degree of importance.

2. The medical data processing apparatus according to claim 1, wherein the compression ratio is set in multiple stages for a single medical image.

3. The medical data processing apparatus according to claim 1, wherein the processing circuitry is further configured to determine the at least one region of interest and the corresponding degree of importance based on at least one of image information or patient information.

4. The medical data processing apparatus according to claim 1, wherein the processing circuitry is further configured to determine the at least one region of interest and the corresponding degree of importance according to an application for analyzing the medical image of the applications for analyzing the image.

5. The medical data processing apparatus according to claim 1, wherein the processing circuitry is further configured to set a first region of interest with a highest degree of importance to a first compression ratio of lossless compression and set a second region of interest to a second compression ratio of lossy compression.

6. The medical data processing apparatus according to claim 1, wherein the processing circuitry is further configured to determine the compression ratio of each region of interest, of the at least one region of interest, so that a region of interest with a higher degree of importance has a lower compression ratio.

7. The medical data processing apparatus according to claim 1, wherein the processing circuitry is further configured to generate compressed data of the medical image by compressing the at least one region of interest according to the corresponding compression ratio.

8. The medical data processing apparatus according to claim 1, wherein the processing circuitry is further configured to generate the at least one region of interest related to the medical image and the corresponding degree of importance of the at least one region of interest by inputting the medical image to a trained model, the trained model being trained using an image for training and a type of image analysis as input data and a training region of interest on the image for training that is important for the image analysis and a corresponding degree of importance as ground truth data.

9. The medical data processing apparatus according to claim 8, wherein the processing circuitry is further configured to determine the corresponding degree of importance of the at least one region of interest based on a heat map of the trained model related to feature extraction.

10. A medical data processing method, comprising:
  determining at least one region of interest for performing processing on a medical image and a corresponding degree of importance of the region of interest; and
  determining a compression ratio for each region of interest, of the determined at least one region of interest, according to the corresponding degree of importance by referring to a table, for each of applications for analyzing the medical image, indicating a relationship between the compression ratio and the corresponding degree of importance.

* * * * *